United States Patent [19]

de Magondeaux

[11] 3,963,891

[45] June 15, 1976

[54] CHOKED CONDITION DETECTOR FOR AN AIR-PURIFYING DEVICE

[75] Inventor: Maurice de Magondeaux, Neuilly-sur-Seine, France

[73] Assignee: Sofiltra, Societe Industrielle de Filtration, Courbevoie, France

[22] Filed: Oct. 2, 1974

[21] Appl. No.: 511,106

[30] Foreign Application Priority Data

Oct. 3, 1973   France .............................. 73.35328

[52] U.S. Cl. ................................. 200/308; 55/274; 55/DIG. 34; 116/114 PV; 340/239 F
[51] Int. Cl.² ..................... H01H 3/00; G01D 13/00
[58] Field of Search .... 340/239 F; 55/274, DIG. 34; 292/19; 116/114 PV; 200/308

[56] References Cited
UNITED STATES PATENTS

| | | | |
|---|---|---|---|
| 1,094,279 | 4/1914 | Wagner | 292/19 |
| 3,397,395 | 8/1968 | Pierce | 340/239 F |
| 3,443,365 | 5/1969 | Lee et al. | 55/274 |
| 3,678,881 | 7/1972 | Shinn | 340/239 F X |

Primary Examiner—John W. Caldwell
Assistant Examiner—Daniel Myer
Attorney, Agent, or Firm—Lee C. Robinson, Jr.

[57] ABSTRACT

The invention relates to a device for detecting the choked condition of an air purifier in which the device comprises a casing having a first compartment in pressure relation with said purifier and a second compartment in relation to atmospheric pressure, an indicator connected to a diaphragm between said compartments and a switch inserted in the supply circuit of an electric indicator device and actuated by said diaphragm, locking and unlocking means being provided so as to maintain said switch in the closed position and to liberate said switch from said closed position. The invention permits the remote indication of internal pressure of an air purifier of an internal combustion engine, so as to indicate the degree of fouling or choking of this purifier, even when the engine is stopped.

6 Claims, 2 Drawing Figures

CHOKED CONDITION DETECTOR FOR AN AIR-PURIFYING DEVICE

The present invention relates to a device for detecting the choked condition of an air purifier for internal combustion engines. The device advantageously includes a casing having a wall which is transparent, at least in part, and is divided internally by a flexible diaphragm so as to form a first compartment in pressure relation with said purifier and a second compartment exposed to atmospheric pressure, an indicator connected to said diaphragm and adapted to appear in the transparent portion of said wall when the difference in pressure between said two compartments reaches a pre-determined value, locking means associated with said diaphragm and unlocking means provided respectively to maintain said indicator in its visible position or to move it from said position.

The devices of this type known at the present time have the disadvantage that they do not permit a remote control of their depression threshold, that is to say the choked-up condition of the purifier or air filter, since this blocked condition is indicated solely by an indicator which is directly associated with the device.

It has already been proposed to remedy this disadvantage by using a separate indicator or the like, coupled by a depression conduit to the first compartment referred to above. The addition of such a conduit results in a complication of the assembly of the device, risks of leakage and a non-negligible increase in its production cost.

Choking detectors are also known, utilized for air filters for internal combustion engines, which actuate a light or sound signal beyond a certain degree of depression in the outlet conduit of the filter. However, these detectors have the disadvantage that they only operate when a depression exists at the outlet of the filter, that is to say when the engine is working.

The device according to the invention has for its object to obviate these disadvantages and it is characterized in that it comprises a switch housed in said first compartment and inserted in the supply circuit of an electric indicator device, said switch being actuated by said diaphragm, and said locking and unlocking means being respectively provided so as to maintain said switch in the closed position and to liberate said switch from said closed position.

The device according to the invention thus permits a remote indication of the choked state of this purifier even when the engine is stopped.

On the other hand, the use of an electric indicator device considerably simplifies the connection to the first compartment of the detector, the installation of electrical conductors being much easier and much more economical than the installation of a depression conduit necessary for the previously known devices.

According to a further characteristic feature of the invention, the above-mentioned switch comprises two contacts supported by spring blades, an abutment fixed on the deformable diaphragm being provided in order to bring one of the said contacts into contact with the other for the position of the said diaphragm corresponding to the appearance of the indicator in the transparent portion previously referred to.

The supply circuit of the said electric indicator device is thus closed as long as the incorporated indicator remains apparent, that is to say as long as the diaphragm is blocked.

According to still another characteristic feature of the invention, the locking means comprise a member in the shape of a hairpin fixed on the diaphragm, the two arms of which are engaged in a fixed opening, on the edge of which they are elastically supported, the said arms being provided, in the vicinity of their free extremities, with teeth or beaks intended to come into engagement with the said edge.

A locking device of this kind has the advantage of being particularly simple to construct and extremely reliable in operation.

Other characteristic features and advantages of the invention will become apparent during the course of the description which follows below, reference being made to the accompanying drawings, given solely by way of example and without any restriction. In these drawings.

Figure 1:
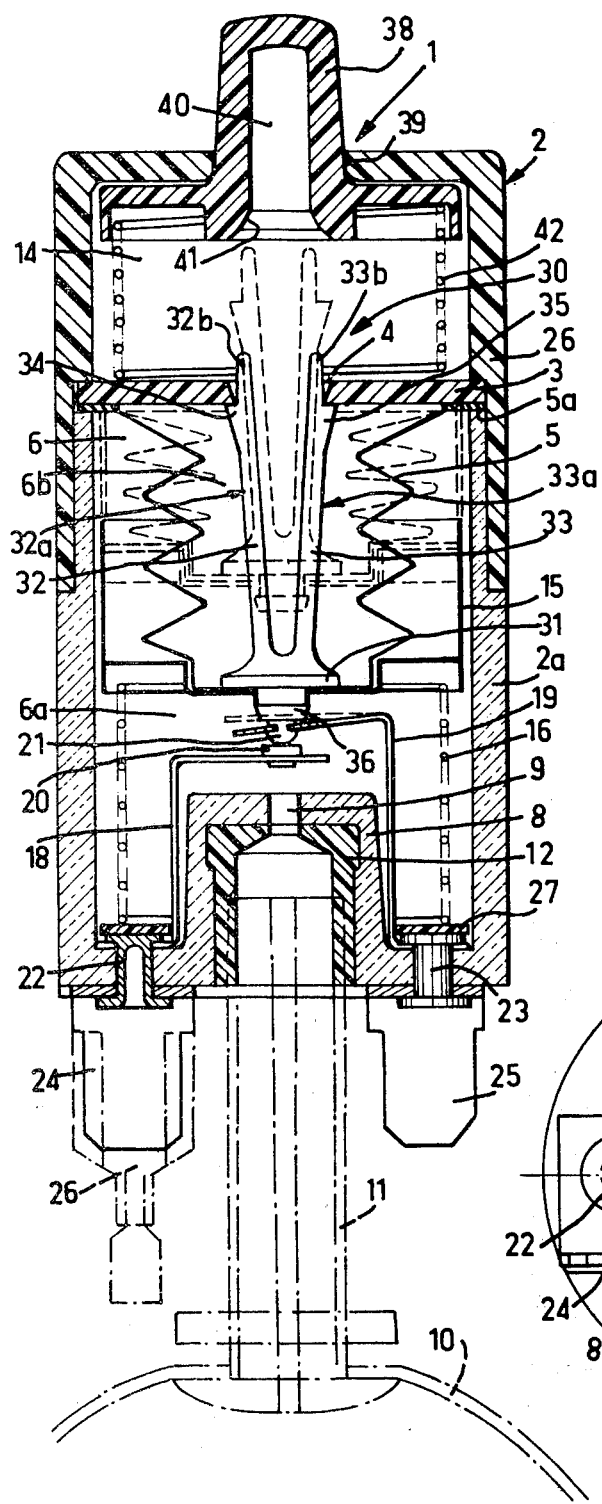
FIG. 1 is an axial section of a device according to the invention, intended for the detection of the choked condition of an air filter for an internal-combustion engine, together with a broken line representation of associated structure.
Figure 2:
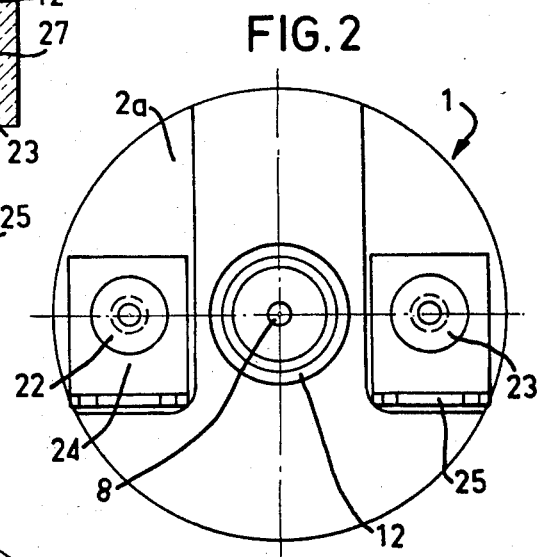
FIG. 2 is a view looking on the underside of the device shown in FIG. 1.

In the form of embodiment shown in the accompanying drawings, the device according to the invention designated generally by the reference 1, comprises a casing 2 having the general shape of a cylinder of circular transverse section and formed of two parts 2a and 2b, joined together by fitting one into the other and made fast together, for example by glueing. The lower part 2a is of transparent material, for example a methyl metacrylate, while the upper part 2b is made of an opaque material such as a polycarbonate.

Inside the casing there is provided a rigid transverse partition 3 provided with a circular central opening 4. This partition, retained by being gripped between the two parts 2a and 2b of the said casing, serves as a supporting surface for a deformable diaphragm 5 in the form of a bellows and made of a material such as natural or synthetic rubber. This diaphragm 5, the edge 5a of which is applied in a fluid-tight manner against the partition 3 by the part 2b, divides the internal space 6 of the casing 2 into two separate compartments 6a and 6b, respectively outside and inside the said bellows-shaped diaphragm.

The lower part 2a comprises on its bottom wall a yoke 8 or the like projecting towards the interior of the said part and traversed by an orifice 9. The orifice 9 provides communication between the compartment 6a and a conduit 10 connected to the outlet of an air filter for a combustion engine (not shown) through the intermediary of a coupling pipe 11 or the like screwed into a metallic insert 12 housed in the base 8.

The compartment 6b communicates through the opening 4 in the partition 3, with the upper space 14 which is in direct communication with the free atmosphere.

A signal indicator 15 having the shape of a cylindrical ring is fixed to the lower part of the deformable diaphragm 5. The indicator 15 is movable in translation between two extreme positions, one shown in broken lines, corresponding to a maximum compression of the diaphragm and for which it is positioned inside the upper opaque part 2b, and the other shown in full lines and corresponding to a maximum depression in the chamber 6a, for which it comes opposite the lower transparent part 2a and is in consequence visible from the exterior.

A return spring 16 is housed in the interior of the compartment 6a and is supported against the signal indicator 15. The spring 16 biases the indicator 15 and the attached diaphragm 5 in an upward direction, as viewed in FIG. 1, toward the compartment 6b. The indicator 15 serves as an indicator having an axial position which is determined by differences in pressure between the compartments 6a and 6b.

Inside the lower compartment 6a are provided two spring blades 18 and 19 carrying contacts 20 and 21 respectively. These spring blades are connected to electrically conductive contact studs 22 and 23 or the like, which pass through the bottom wall of the lower part 2a and are in turn connected to thimbles 24 and 25 intended to receive pins such as 26 connected to an electric circuit (not shown) for example the supply circuit of an electric indicator device. At the bottom of the compartment 6a, there is provided an insulating washer 27 on which the spring 16 is supported in such manner as to insulate this latter from the studs 22 and 23.

The device further comprises a locking device for the diaphragm, constituted by a member 30 made of an elastically deformable material such as Delrin, and having the shape of a hairpin. The member 30 is fixed by its lower transverse extremity 31 to the deformable diaphragm 5, while its two branches 32 and 33, which can approach and move away elastically from each other, are engaged in the central opening 4 of the rigid transverse partition 3.

Each arm 32 and 33 is provided, in the vicinity of its upper free extremity, with a tooth 34 and 35 respectively, projecting towards the exterior and intended to engage the edge of the opening 4. The member 30 is further provided at its lower part with an electrically insulating abutment 36 intended to engage, when the diaphragm 5 is in the bottom position and in consequence when the signal indicator is visible, the spring blade 19 in such manner as to apply the contact 21 against the contact 20.

The device further comprises an unlocking device, constituted by a knob 38 or the like, mounted slidably in the space 14. This knob projects out of the casing through an orifice 39 passing through the upper wall of the part 2b. A restoring spring 32 is housed in the said space 14 and bears against the knob 38 to tend to push it back towards the top position shown in FIG. 1. The knob 38 is provided internally with a hollow space or blind hole 40 having at its lower portion the shape of a truncated cone, as shown at 41.

The operation of the device is as follows:

The spring 16 being suitably calibrated as a function of a pressure in the conduit 10 corresponding to an air-flow considered as normal, that is to say to a nil or acceptable choked condition of the filter, the diaphragm 5 occupies substantially the position shown in broken lines in FIG. 1.

For this position of the diaphragm 5, the indicator 15, the locking member 30 and the spring blade 19 also occupy the positions shown in broken lines. The result is that the indicator 15 is not visible, the contacts 20 and 21 are separated from each other and the supply circuit of the indicator device is open.

When the blocked condition of the filter increases, the resulting drop in pressure in the conduit 10, and in consequence in the compartment 6a, subjects the bellows-shaped diaphragm 5 to an increasing force due to the pressure difference between the compartments 6a and 6b. When this force exceeds that of the calibrated spring 16, the diaphragm becomes extended and pushes back the said spring 16, carrying with it the locking member 30 and the indicator 15. The two arms 32 and 33 of the locking member 30 first slide with light friction by their edges 32a and 33a against the edge of the opening 4.

When the diaphragm 5 has reached the end position shown in full lines in FIG. 1, the abutment 36 has pushed back the spring blade 19 in such manner that the contact 21 is applied against the contact 20, thus closing the supply circuit of the electric indicator device. When the indicator 15 is positioned opposite the transparent part 2a, the teeth 34 and 35 on the arms 32 and 33 of the member 30 engage the edge of the orifice 4, thus locking the diaphragm in its position of maximum extension. With this arrangememt the indicator 15 remains visible and the electric indicator device remains in operation, even in the absence of a difference of pressure between the compartments 6a and 6b, that is to say in the absence of a depression in the conduit 10.

In order to free the diaphragm and to bring the device again into the operating condition, after having for example replaced the choked filter by a new filter, it is only necessary to depress the knob 38 against the action of the spring 42. By virtue of the engagement of the free extremities 32b and 33b of the arms 32 and 33 of the member 30 in the conical portion 41 of the knob 38, the arms 32 and 33 are moved closer together and in consequence free the teeth 34 and 35 from the edge of the orifice 4.

Numerous alternatives could be made to the form of embodiment described and shown, without thereby departing from the scope of the invention. Thus, it would be possible to replace the system of contacts carried by the spring blades by a switch of another type or again by an electronic circuit-breaker.

What I claim is:

1. A device for detecting the choked condition of an air purifier for an internal combustion engine, the device comprising, in combination:

a casing having a wall including a transparent portion;

means within the casing for defining an opening;

a flexible diaphragm supported within the casing, the diaphragm dividing the interior of the casing into first and second compartments;

means for supplying a variable pressure to the first compartment, the second compartment being exposed to an atmospheric reference pressure;

an indicator connected to the diaphragm within the casing, the indicator being normally located in a nonvisible position but being movable by said diaphragm to a visible position adjacent said transparent portion in response to a predetermined difference in pressure between the two compartments; and locking means for releasably maintaining the indicator in its visible position, the locking means including a hairpin-shaped member having a central portion connected to the diaphragm and a pair of arms extending through said opening for axial movement therein in response to movement of said diaphragm.

2. A device for detecting the choked condition of an air purifier for a combustion engine, the device comprising, in combination:
- a casing having a wall including a transparent portion and an opaque portion;
- a transverse partition mounted within the casing and defining an opening;
- a flexible diaphragm carried by the transverse partition, the diaphragm dividing the interior of the casing into first and second compartments;
- means for supplying the pressure within said purifier to the first compartment, the second compartment being exposed to a reference pressure;
- an indicator connected to the diaphragm within the casing, the indicator being normally located in a nonvisible position adjacent the opaque portion of said wall but being movable by said diaphragm to a visible position adjacent said transparent portion in response to a predetermined difference in pressure between the two compartments;
- switch means located in the first compartment in position to be actuated by the diaphragm, the switch means being movable between an open position and a closed position; and
- locking means for releasably maintaining the indicator in its visible position and the switch means in its closed position, the locking means including a control knob and a resilient member connected to the diaphragm, the control knob being movably mounted on the casing in position to engage the resilient member.

3. A device for detecting the choked condition of an air purifier for an internal combustion engine, the device comprising, in combination:
- a casing having a wall including a transparent portion and an opaque portion;
- a transverse partition mounted within the casing and defining an opening;
- a flexible diaphragm carried by the transverse partition, the diaphragm dividing the interior of the casing into first and second compartments;
- means for supplying the pressure within said purifier to the first compartment, the second compartment being exposed to atmospheric pressure;
- an indicator connected to the diaphragm within the casing, the indicator being normally located in a nonvisible position adjacent the opaque portion of said wall but being movable by said diaphragm to a visible position adjacent said transparent portion in response to a predetermined difference in pressure between the two compartments;
- switch means located in the first compartment in position to be actuated by the diaphragm, the switch means being movable between an open position and a closed, actuated position;
- locking means for releasably maintaining the indicator in its visible position and the switch means in its closed position, the locking means including a control knob and a hairpin-shaped member having a central portion connected to the diaphragm and a pair of arms extending through said opening in resilient engagement with said transverse partition, the control knob being slidably mounted on the casing and defining a conical cavity in position to engage the arms to move said arms toward one another and thereby disengage the same from said transverse partition.

4. A device for detecting the choked condition of an air purifier for an internal combustion engine, the device comprising, in combination:
- a casing having a cylindrical wall including a transparent portion and an opaque portion;
- a transverse partition mounted within the casing and defining an axial opening;
- a flexible diaphragm carried by the transverse partition, the diaphragm dividing the interior of the casing into first and second compartments;
- means for supplying the pressure within the purifier to the first compartment, the second compartment being exposed to atmospheric pressure;
- a cylindrical indicator connected to the diaphragm in coaxial relationship with the cylindrical wall of the casing, the indicator being normally located in a nonvisible position adjacent the opaque portion of said wall but being movable by said diaphragm to a visible position adjacent said transparent portion in response to a predetermined difference in pressure between the two compartments;
- switch means located in the first compartment in position to be actuated by the diaphragm, the switch means being movable between an open position and a closed position;
- locking means for releasably maintaining the indicator in its visible position and the switch means in its closed position, the locking means including a control knob and a hairpin-shaped member having a central portion connected to the diaphragm and a pair of arms extending through said axial opening in resilient engagement with said transverse partition, the control knob being slidably mounted on the casing and defining a conical cavity in position to engage the arms to move said arms toward one another and thereby disengage the same from said transverse partition.

5. A device according to claim 4, wherein said switch means comprises two contacts, a pair of spring blades respectively supporting said contacts and an abutment fixed on said flexible diaphragm in position to bring one of said contacts into contact with the other when said indicator appears in said transparent portion.

6. A device according to claim 4, said arms being axially movable within said opening in response to movement of said diaphragm.

* * * * *